United States Patent [19]

Beech

[11] Patent Number: 4,658,296
[45] Date of Patent: Apr. 14, 1987

[54] DYNAMIC NOISE REDUCTION FOR VIDEO

[75] Inventor: Brian H. Beech, Hampshire, United Kingdom

[73] Assignee: Independent Broadcasting Authority, London, United Kingdom

[21] Appl. No.: 668,769
[22] PCT Filed: Mar. 5, 1984
[86] PCT No.: PCT/GB84/00069
§ 371 Date: Oct. 30, 1984
§ 102(e) Date: Oct. 30, 1984
[87] PCT Pub. No.: WO84/03599
PCT Pub. Date: Sep. 13, 1984

[30] Foreign Application Priority Data

Mar. 3, 1983 [GB] United Kingdom ............... 8305858

[51] Int. Cl.⁴ .............................. H04N 5/213
[52] U.S. Cl. .................... 358/167; 358/166; 358/141; 455/43; 455/70
[58] Field of Search ............ 358/167, 166, 141, 142, 358/186, 188, 36, 37; 455/43, 68, 70, 71, 72; 375/38

[56] References Cited

U.S. PATENT DOCUMENTS

| | | | |
|---|---|---|---|
| 3,283,063 | 11/1966 | Kawashima et al. | 358/167 |
| 3,444,469 | 5/1969 | Miyagi | 455/70 X |
| 3,517,314 | 6/1970 | Miyagi | 325/46 |
| 3,919,640 | 11/1975 | Simciak | 375/38 X |
| 4,191,968 | 3/1980 | Kirk, Jr. | 358/141 |
| 4,459,613 | 7/1984 | Faroudja | 358/167 |
| 4,481,547 | 11/1984 | Sato | 358/167 X |
| 4,521,803 | 6/1985 | Gittinger | 358/141 X |

Primary Examiner—Michael A. Masinick
Assistant Examiner—E. Anne Toth
Attorney, Agent, or Firm—Watson Cole Grindle & Watson

[57] ABSTRACT

In a system in which an information signal is transmitted along with digital data from a transmitter to a receiver, transmitter circuitry is provided which produces digital data indicative of parameters relating to noise reduction for the information signal, and receiver circuitry is provided responsive to the digital data so as to optimize reception of the information signal. In one embodiment of the invention, one of a plurality of different pre-emphasis levels is applied to a signal and digital data is produced according to a value of pre-emphasis added. The digital data and the pre-emphasized signal are then transmitted. The receiver decodes the digital data and adds a corresponding amount of de-emphasis to the received information signal. In another embodiment the digital data indicates an optimum value for a parameter to be applied to a threshold extension demodulator in the receiver.

8 Claims, 5 Drawing Figures

DYNAMIC NOISE REDUCTION FOR VIDEO

The present invention relates to a method and apparatus for reducing the visible noise observed on a picture due to the noise contribution of the transmission channel. It is intended primarily for channels used to transmit video information obtained by the sampling of a picture signal, which video information is transmitted accompanied by digital data which provides information regarding the transmitted signal.

The fundamental idea is to produce digital data indicative of a value of a parameter of the signal to be transmitted which can be used at the receiving apparatus to effect a noise reduction of the received signal.

The present invention provides apparatus for monitoring an information signal to be transmitted comprising means for receiving an input signal to be monitored, means for quantifying an optimum value of a parameter of the information signal to be transmitted and for generating a data signal indicative of the quantity of the parameter, and means for generating the data signal and the information signal.

The present invention further provides apparatus for receiving an information signal accompanied by a data signal containing information relating to the information signal, comprising means for receiving the data signal, means for receiving the information signal, means for processing the received information, and means responsive to the received data signal for controlling the processing means whereby to optimise reception of the information signal.

The noise reduction is effected in either or both of the following ways:

1. By reducing the thermal noise on the received video;
2. By reducing the number of threshold spikes on the received video when an F.M. channel is used.

Features and advantages of the present invention will become apparent from the following description of an embodiment thereof given by way of example when taken in conjunction with the accompanying drawings, in which.

The noise reduction method and apparatus of this invention would be especially suited for use in a T.V. system such as the M.A.C. system. In this system samples of an input picture signal are taken at times determined by certain clock frequencies. One clock frequency controls the sampling rate for luminance and another clock frequency controls the sampling rate for chrominance. The signals produced in this way are compressed such that one line of T.V. signal consists of a chrominance signal followed by a luminance signal, both accompanied by a digital data burst which provides sound channels and sync information.

It is proposed in the present invention to utilize the clock frequencies supplied by the M.A.C. system in such a way as to divide up a line of T.V. signal into signal elements or blocks, such that there will be a set of elements corresponding to the luminance signal and a set of elements corresponding to the chrominance signal. These signal elements do not have to be elements having a width of a single T.V. line, but could be elements having a width of, for example, a plurality of T.V. lines, e.g. 4. These signal elements can then be separately evaluated to produce the data associated with the noise reduction system. This data can then be transmitted with the other digital data inherent in the M.A.C. system.

(1) Thermal Noise Reduction

Figure 1:
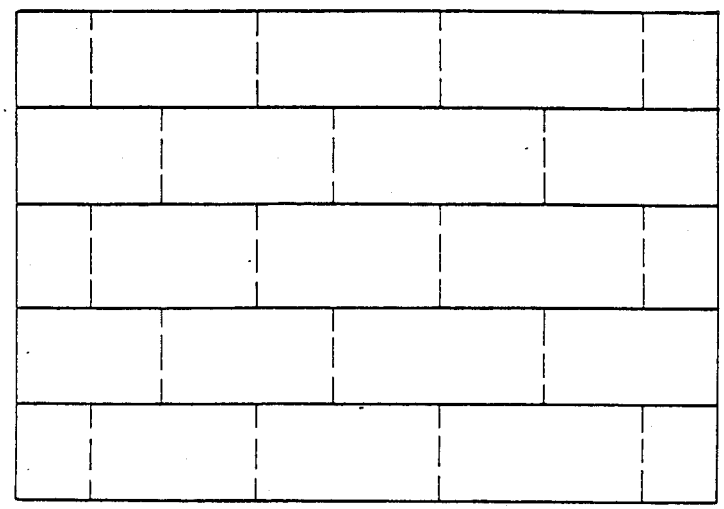
FIG. 1 shows a representation of a frame of a television picture.

The full frame of a television picture is considered as being divided into a discrete number of boxes as shown in FIG. 1.

Noise reduction is effected by choosing optimum values for video pre and de-emphasis for each box. There are a plurality of choices e.g. 4 choices of pre and de-emphasis values. The data link between transmitter and receiver ensures that the pre-emphasis at the transmitter is at all times accurately complimentary to the de-emphasis at the receiver.

The choice of pre-emphasis for each box is made at the transmitter by circuitry which is monitoring the incoming video signal and which will be described in more detail later.

Changes of pre-emphasis at the transmitter are not instantaneous but are defined by the step response of a band-limiting filter (18). The receiver contains a similar filter. The filter responses are accurately defined so as to guarantee tracking of the pre and de-emphasis levels not only in the steady rate, but also under dynamic conditions.

The pre-emphasis decision circuitry can be organized to allow the maximum possible amount of pre-emphasis for each box, consistent with the following rules:

(a) The pre-emphasised video signal shall not over modulate the carrier in the transmission channel.
(b) The pre-emphasis selected shall not be so high as to impair the performance of the threshold extension demodulators used at the receiver. This criterion applies only when an F.M. channel is used.

(2) Threshold Spike Reduction

It is a property of threshold extension demodulators that for any given signal condition, there is an optimum setting for the parameters of the demodulator (e.g. loop bandwidth in the case of a phase lock loop demodulator).

If the parameters are fixed, then they must be set at the optimum level for the worst case parts of the picture giving non-optimum performance overall.

The spike reduction technique described here assumes the full frame to be divided into boxes. Spike reduction is effected by choosing optimum values for the demodulator parameters for each box. There are a plurality of values e.g. for parameters.

The data link between the transmitter and receiver serves to control the demodulator (33). The transmitted signal is not affected by the data.

The choice of demodulator parameters for each box is made at the transmitter by circuitry which is monitoring the incoming video signal.

The overall effect of this system is to reduce the probability of threshold spikes in areas of a picture which do not contain high level detail.

Noise reduction systems 1 and 2 may be operated independently.

If they are operated simultaneously there would normally be a doubling of the overall data rate required.

However, in the present invention both systems can be operated simultaneously without any increase in the number of data bits required. That is the digital information indicating a certain value of pre-emphasis to be added to a signal can also indicate a certain value of a parameter to be applied to the threshold extension demodulator. For instance, digital information which indicates an increase in the pre-emphasis value added to a signal could also indicate an increase in the threshold extension, for example, of a threshold extension demodulator.

This allows both systems to operate with no more data rate than either system individually.

Typical Data Rates

The following parameters are proposed for a noise reduction system for MAC.

Chrominance samples per line—60
Luminance samples per line—60
Total number of bits for full screen width=240.
 The data to be shared over 2 frames
 The data to be shared over 10 lines (Y)
 The data to be shared over 5 lines (U)
 The data to be shared over 5 lines (V)

This corresponds to a mean data rate of 16 *bits per line.*

It should be noted that to reduce the data rate to this level, frame delays are required at the transmitter but *not* at the receiver. The receiver requires sufficient memory only to store the control data:

i.e. 16 bits×625=1250×8 bit word for one full frame

Now that the basic system has been described in outline, the method and apparatus used for determining the choice of pre-emphasis at the transmitter is described briefly below.

Consider a single TV line to be divided into elements.

Each element is to be assigned its own individual level of pre-emphasis. The receiver must assign an equal amount of de-emphasis in order that the resultant video is a faithful reproduction of the original.

The signal to noise ratio of the resultant received video improves at the level of pre-emphasis is increased. The actual improvement obtained depends on the precise nature of the pre-emphasis curves.

In order to obtain the maximum possible noise improvement within each element, the system must calculate how much pre-emphasis may be applied to that element without causing the carrier to over-deviate. A second consideration is that application of too much pre-emphasis will degrade the performance of threshold extension demodulators used at the receiver.

Figure 2:
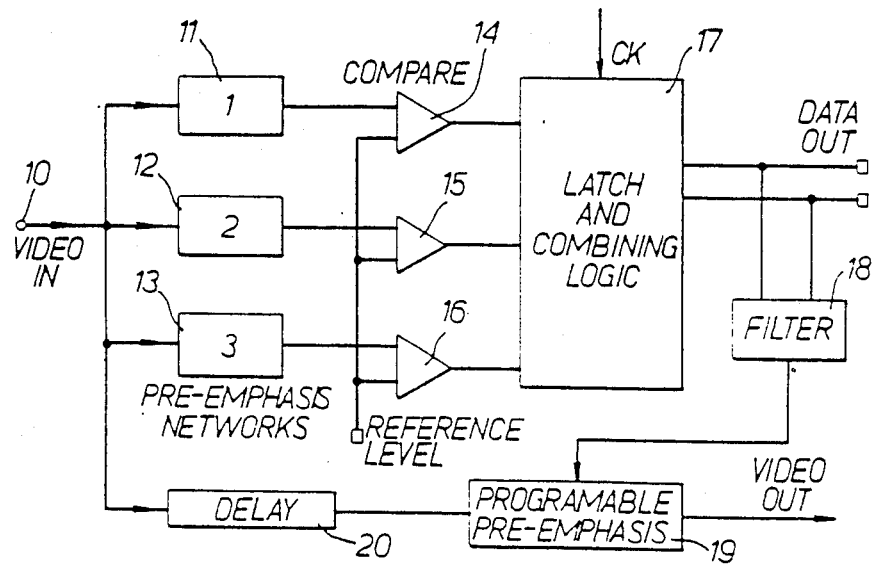
FIG. 2 shows a block diagram of a circuit according to the present invention and which is used at a transmitter.

FIG. 2 shows the technique used in our system to determine the pre-emphasis level based on the first criterion.

We have four choices of pre-emphasis level. One of these represents zero pre-emphasis, but there may be (and is in our system) some fixed pre-emphasis which operates in addition to the dynamic pre-emphasis.

The system operates as follows. Incoming video is passed simultaneously through three fixed networks (11,12,13) which correspond precisely with the levels obtainable from a 4 level programmable network (19) (the fourth level represents zero pre-emphasis).

The outputs from the fixed networks are compared (14,15,16) with a reference level which represents the maximum signal amplitude allowable for full modulation of the carrier. The combining logic (17) produces a 2-bit data word representing the maximum allowable level of pre-emphasis.

The combining logic (17) contains latching circuitry and the data output is synchronous with a reference clock signal. At the receiver, accurate regeneration of this clock signal is vital to the operation of the system, since timing error will result in a distortion of the de-emphasised signal.

Figure 3:
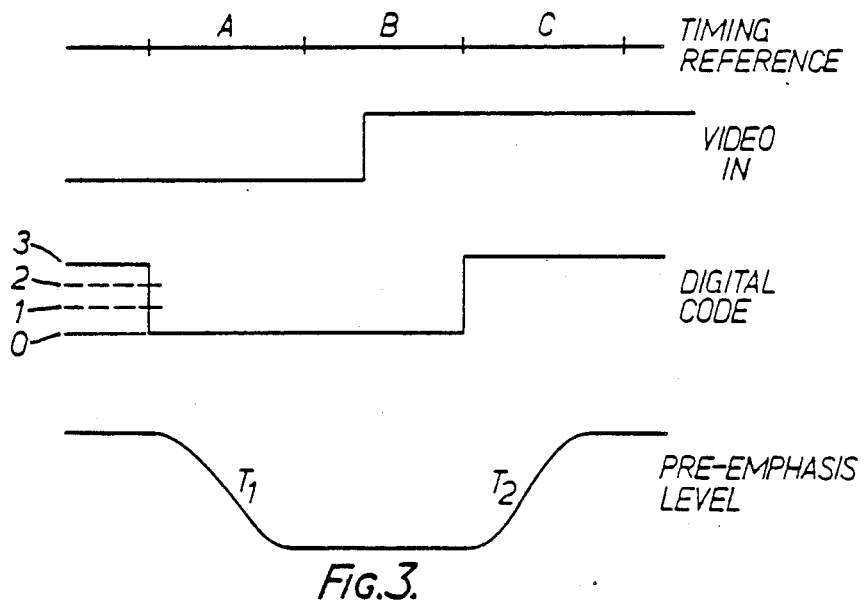
FIG. 3 shows waveform to assist understanding of the operation of the circuit shown in FIG. 2.

FIG. 3 illustrates operation of the system in response to a large amplitude transition in the video signal.

Before the transition, the digital code is 3, corresponding to maximum pre-emphasis. The transition occurs during timing interval B, so the logic produces a digital code covering intervals A and B. This is possible since a delay is incorporated in the video (FIG. 2).

The pre-emphasis levels are not discrete but are continuously variable. $T_1$ and $T_2$ (FIG. 3) are accurately defined controlled transitions. The system guarantees that the pre-emphasis level is valid throughout interval B.

The system described so far guarantees that the pre-emphasised video signal will not over modulate the transmission channel. It may however actually degrade the video obtained from a threshold extension demodulator. This is because the high frequency content of the signal is brought up to a more constant level and threshold extension demodulators in general have a limited ability to track high level high frequency components.

It is important to limit the pre-emphasis to a level acceptable to the demodulator.

Figure 4:
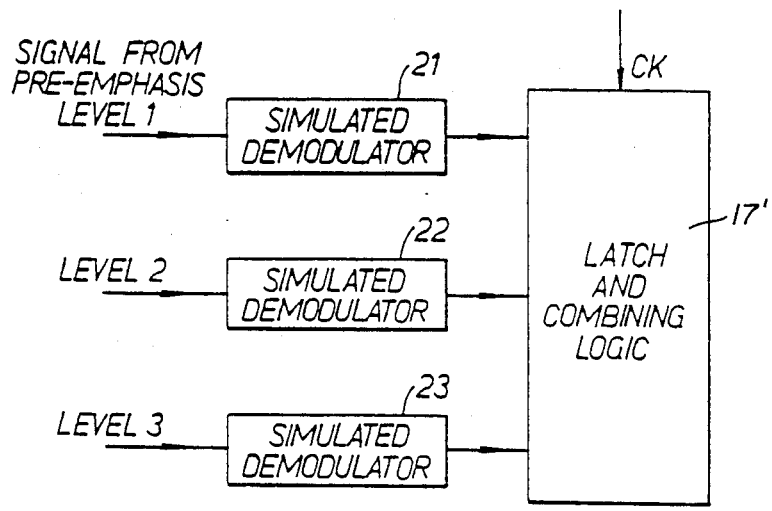
FIG. 4 shows a modification for the circuit shown in FIG. 2.

FIG. 4 shows the basic way in which this can be achieved.

The outputs from the pre-emphasis networks (FIG. 2) are passed into circuits (21,22,23) which simulate a state of the art threshold extension demodulator. This provides an output which indicates failure of the demodulator to track the signal. The outputs are passed into the combining logic. The pre-emphasis level is limited to the highest level consistent with signal tracking.

The 'simulated demodulator' function will change with time as developments are made in demodulator design.

Figure 5:
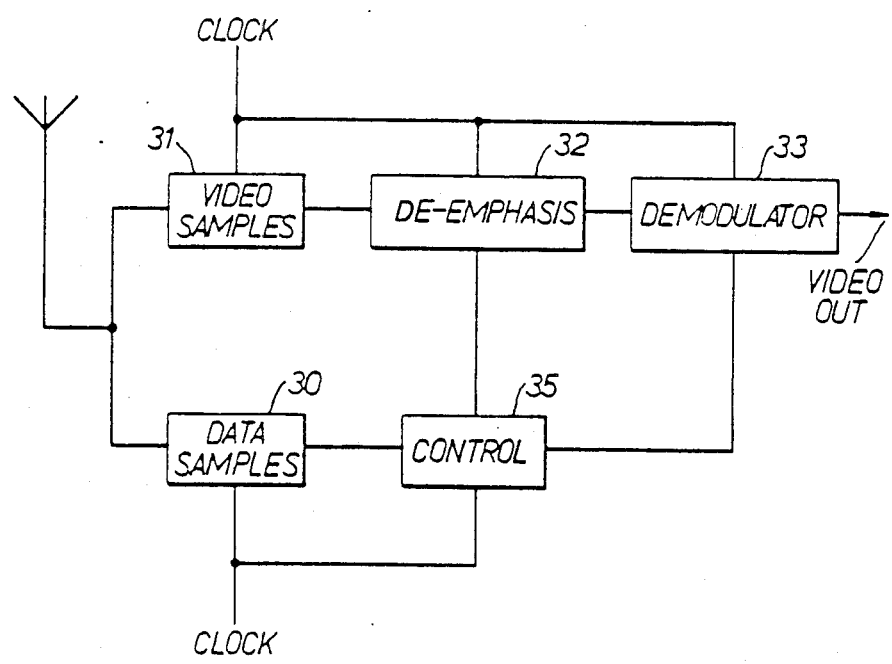
FIG. 5 shows a block diagram of a part of receiving apparatus for receiving a signal transmitted by the transmitter shown in FIG. 2.

FIG. 5 shows part of a receiver circuit for use with the apparatus of the present invention. Means for receiving the video samples (31) and the data samples (30) are provided. Also shown is a control circuit (35) which, in response to the noise reduction information from the data samples controls the amount of de-emphasis (32) to be applied to the relevant video sample and controls relevant parameters of the demodulator (33). Clocks are provided which are synchronous with similar clocks in the transmitter.

The system as disclosed shows a plurality of pre-emphasis networks (11,12,13) and simulated de-modulators (21,22,23) which act on the incoming picture signal to produce data indicative of noise reduction parameters. A plurality of such circuitry is not essential to the invention. A single pre-emphasis network are simulated demodulator is sufficient. For example, further circuitry could be provided which would cause several values of pre-emphasis to be applied to the incoming signal via the single pre-emphasis network, or would cause a suitable estimation of relevant data values to be made from the application of one value of pre-emphasis to the incoming signal.

I claim:

1. Apparatus for monitoring a sampled video signal to be transmitted by an FM channel, the apparatus comprising: means for receiving an input video signal to be monitored, means for calculating an optimum value of a parameter of the video signal to be transmitted and for generating a digital data signal indicative of the quantity of the parameter, first modifying means for modifying the input video signal by a further signal derived from the calculating means, second modifying means for modifying the input video signal, the calculating means operating on the modified input video signal, the second modifying means comprises a plurality of pre-emphasis networks each arranged to apply a different amount of pre-emphasis to the input video signal, and the calculating means determining the optimum value of pre-emphasis for comparing the outputs of the pre-emphasis networks with a datum level.

2. Apparatus according to claim 1, wherein the further modifying means comprises demodulator means for simulating demodulation conditions of the input video signal.

3. Apparatus according to claim 1 wherein the calculating means is arranged to produce a digital data signal for each sample of input video signal.

4. Apparatus according to claim 1 wherein the input video signal represents a portion of one line of video signal.

5. Apparatus according to claim 1 wherein the input video signal represents portions of a plurality of lines of a video signal.

6. Apparatus for monitoring a sampled video signal to be transmitted by an FM channel, the apparatus comprising: means for receiving an input video signal to be monitored, means for calculating an optimum value of a parameter of the video signal to be transmitted and for generating a digital data signal indicative of the quantity of the parameter, first modifying means for modifying the input video signal by a further signal derived from the calculating means, second modifying means for modifying the input video signal, the calculating means operating on the modified input video signal, and the second modifying means comprises demodulator means for simulating demodulation conditions of the input video signal.

7. Apparatus according to claim 6 wherein the input video signal represents a portion of one line of video signal.

8. Apparatus according to claim 6 wherein the input video signal represents portions of a plurality of lines of a video signal.

* * * * *